US008333650B2

(12) United States Patent
Vann

(10) Patent No.: US 8,333,650 B2
(45) Date of Patent: Dec. 18, 2012

(54) GAMING SYSTEM HAVING SYMBOL PROMOTION FEATURES

(75) Inventor: Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 500 days.

(21) Appl. No.: 12/465,403

(22) Filed: May 13, 2009

(65) Prior Publication Data

US 2009/0286592 A1 Nov. 19, 2009

Related U.S. Application Data

(60) Provisional application No. 61/127,498, filed on May 14, 2008.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................... 463/20; 463/21

(58) Field of Classification Search ..................... 438/20
See application file for complete search history.

(56) References Cited

U.S. PATENT DOCUMENTS 5,280,909 A 1/1994 Tracy
5,769,716 A 6/1998 Saffari et al.
6,159,097 A 12/2000 Gura
2003/0092482 A1 5/2003 Meyer
2003/0186737 A1 10/2003 Bennett et al.
2004/0009810 A1 1/2004 Moody
2004/0038731 A1 2/2004 Englman
2004/0038741 A1 2/2004 Gauselmann
2004/0048652 A1* 3/2004 Ching et al. .................... 463/20
2004/0224746 A1 11/2004 Fong
2004/0248642 A1 12/2004 Rothschild
2005/0026672 A1 2/2005 Roukis
2005/0119038 A1 6/2005 Stern
2005/0176494 A1 8/2005 Thomas
2005/0215311 A1* 9/2005 Hornik et al. ................... 463/20
2006/0068892 A1* 3/2006 Gomez et al. ................... 463/20
2006/0084494 A1 4/2006 Belger et al.
2006/0111169 A1 5/2006 Hornik et al.
2006/0116201 A1 6/2006 Gauselmann
2006/0121978 A1 6/2006 Hornik et al.
2006/0154717 A1 7/2006 Jackson
2006/0178203 A1 8/2006 Hughes et al.
2006/0205491 A1 9/2006 Daley
2007/0026933 A1 2/2007 Tanimura
2007/0060292 A1 3/2007 Peterson
2007/0060314 A1 3/2007 Baerlocher et al.
2007/0117607 A1 5/2007 Olive
2007/0167217 A1 7/2007 Kaminkow et al.
2008/0045302 A1 2/2008 Low
2008/0058063 A1 3/2008 Okada (Continued)

*Primary Examiner* — William M. Brewster
(74) *Attorney, Agent, or Firm* — Nixon Peabody LLP

(57) ABSTRACT

A method for conducting a wagering game on a gaming system comprises receiving a wager to play the wagering game, displaying a first outcome of the wagering game on at least one display, evaluating the first outcome for winning combinations of symbols and awarding awards associated with any such winning combinations. The method further comprises, upon the occurrence of a triggering event and if the first outcome is a winning outcome, promoting each occurrence of at least one symbol in the first outcome to a next higher symbol in accordance with a pay table of the wagering game to display a revised first outcome, and evaluating the revised first outcome for winning combinations of symbols and awarding awards associated with any such winning combinations.

24 Claims, 9 Drawing Sheets

U.S. PATENT DOCUMENTS

2008/0058078 A1 3/2008 Fong
2008/0064481 A1 3/2008 Jackson et al.
2008/0064487 A1 3/2008 Stevens et al.
2008/0081688 A1 4/2008 Plowman
2008/0096625 A1 4/2008 Thomas et al.
2008/0132320 A1 6/2008 Rodgers

* cited by examiner

GAMING SYSTEM HAVING SYMBOL PROMOTION FEATURES

CROSS REFERENCE TO RELATED APPLICATIONS

This application is a U.S. Non Provisional Utility Application, which is related to and claims priority from U.S. Provisional Application No. 61/127,498, filed May 14, 2008, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and methods for playing wagering games, and more particularly, to a gaming system having symbol promotion features.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Therefore, there is a continuing need for gaming machine manufacturers to continuously develop new games and improved gaming enhancements that will attract frequent play through enhanced entertainment value to the player.

One method that may be employed to enhance the entertainment value of a game is the upgrade or promotion of symbols that appear on a display and awarding awards associated with the upgraded symbols. The present invention is directed to a gaming system that upgrades symbols on a display and awards an award associated with the upgraded symbols.

SUMMARY OF THE INVENTION

According to an aspect of the present invention, a method of conducting a wagering game on a gaming system, the method comprising, receiving a wager to play the wagering game, displaying a first outcome of the wagering game on at least one display, evaluating the first outcome for winning combinations of symbols and awarding awards associated with any such winning combinations, upon the occurrence of a triggering event and if the first outcome is a winning combination, promoting each occurrence of at least one symbol in the first outcome to a next higher symbol in accordance with a pay table of the wagering game to display a revised first outcome, and evaluating the revised first outcome for winning combinations of symbols and awarding awards associated with any such winning combinations.

According to another aspect of the present invention, method of conducting a wagering game on a gaming system, the method comprising, receiving a wager to play the wagering game, displaying a first outcome of the wagering game on at least one display, evaluating the first outcome for winning combinations of symbols and awarding a first award for any winning combinations in the first outcome, upon the occurrence of a triggering event and if the first outcome is a winning combination, promoting a first subset of symbols in the first outcome to a next higher symbol in accordance with a pay table of the wagering game to display a revised first outcome, and evaluating the revised first outcome for winning combinations of symbols and awarding a second award for any winning combinations in the revised first outcome.

According to yet another aspect of the present invention, a method of conducting a wagering game on a gaming system, the method comprising, receiving a wager to play the wagering game, displaying a first outcome of the wagering game on at least one display, awarding a first award associated with the first outcome, and upon the occurrence of a triggering event and if the first outcome is a winning combination: (i) promoting at least one symbol associated with the first outcome to a higher symbol in accordance with a pay table of the wagering game to display a revised first outcome, and (ii) awarding a second award associated with the revised first outcome.

According to still yet another aspect of the invention a gaming system for conducting a wagering game includes a wager input device for receiving a wager to play a wagering game, at least one display and at least one controller operative to cause the at least one display to display a first outcome of the wagering game and award a first award associated with the first outcome. The controller is also operative to promote a plurality of symbols associated with the first outcome to a higher symbol in accordance with a pay table of the wagering game to display a revised first outcome upon the occurrence of a triggering event, and award a second award associated with the revised first outcome if the first outcome is a winning combination.

According to yet another aspect of the invention, one or more computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1A:
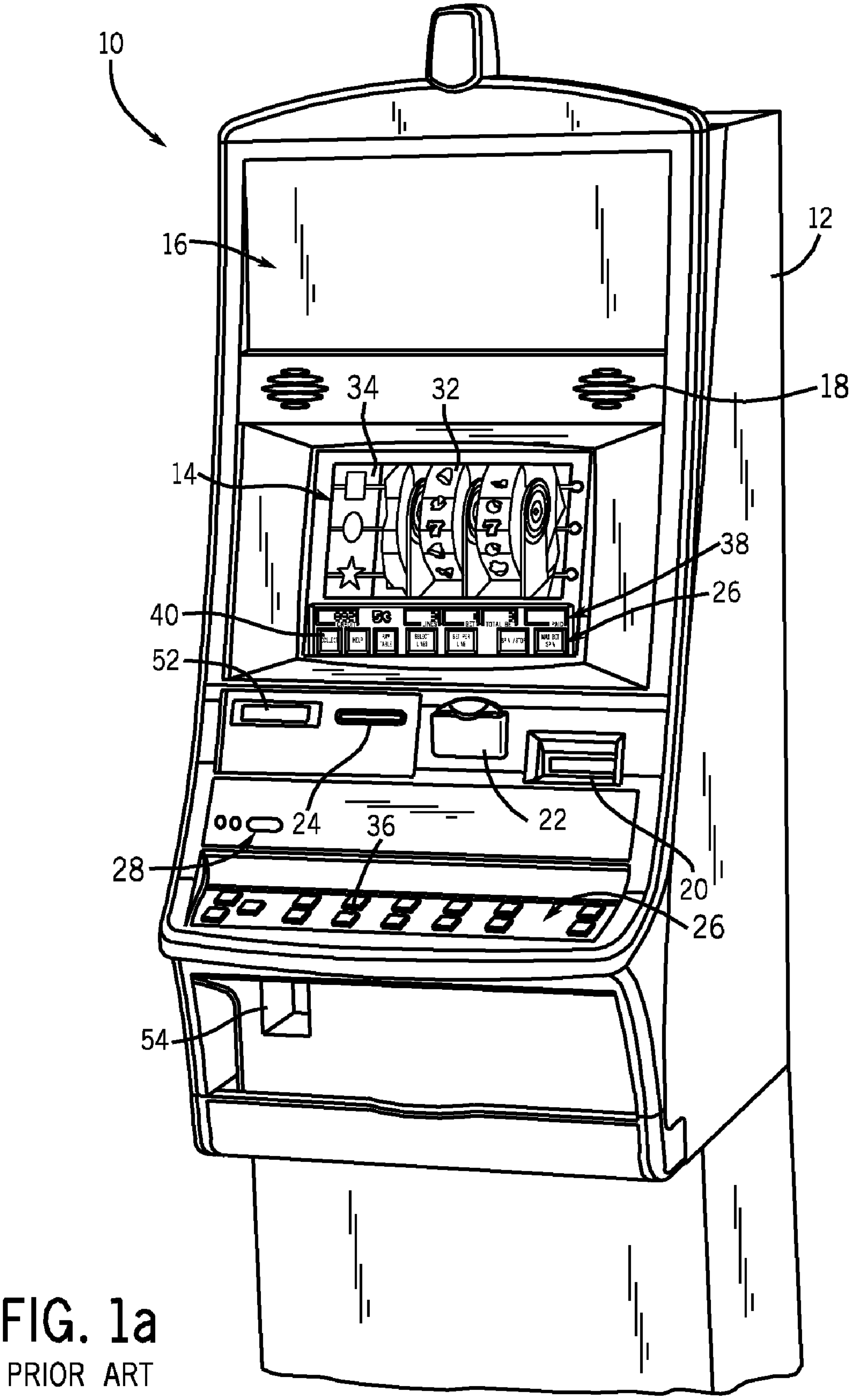
FIG. 1a PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
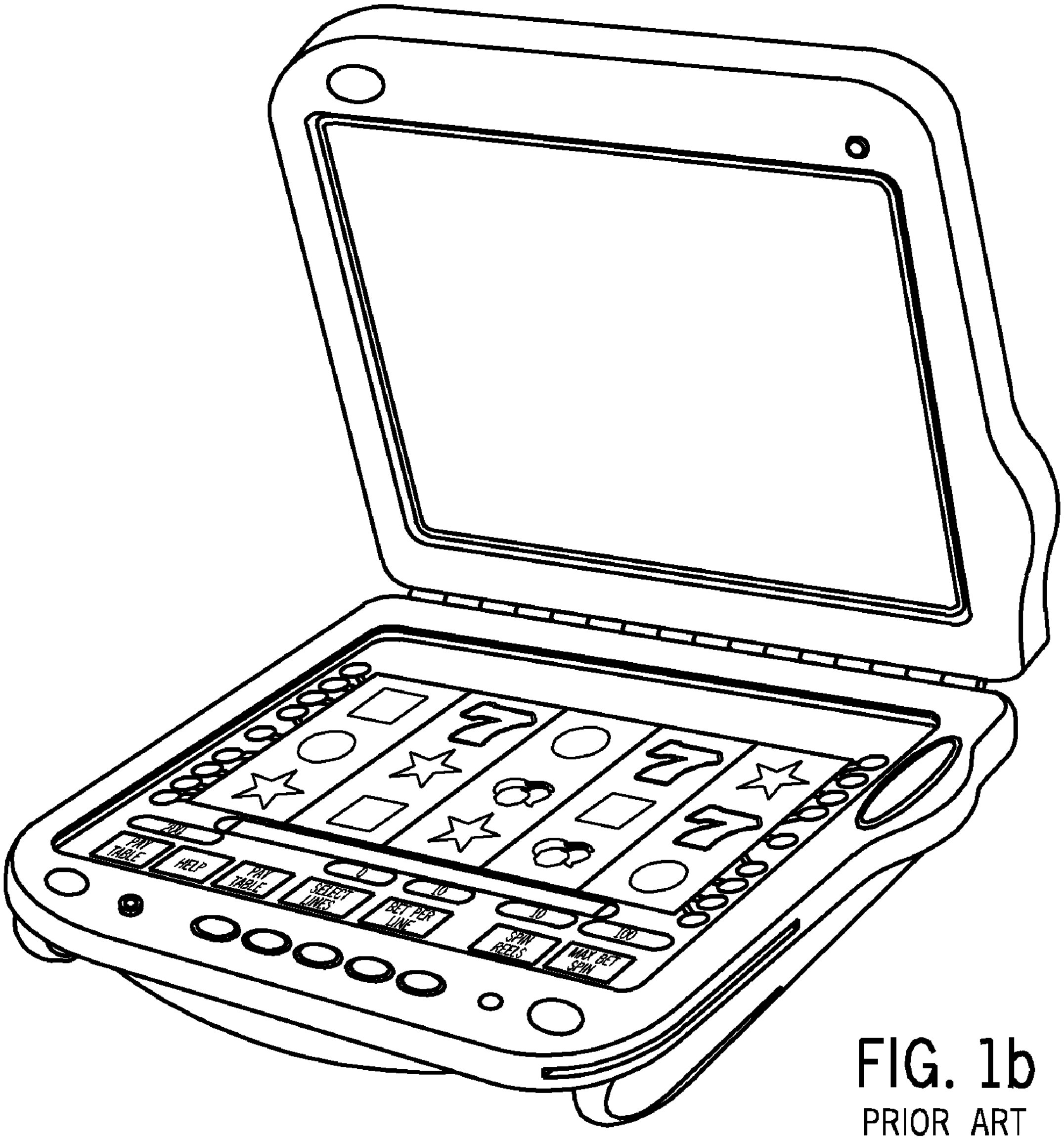
FIG. 1b PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
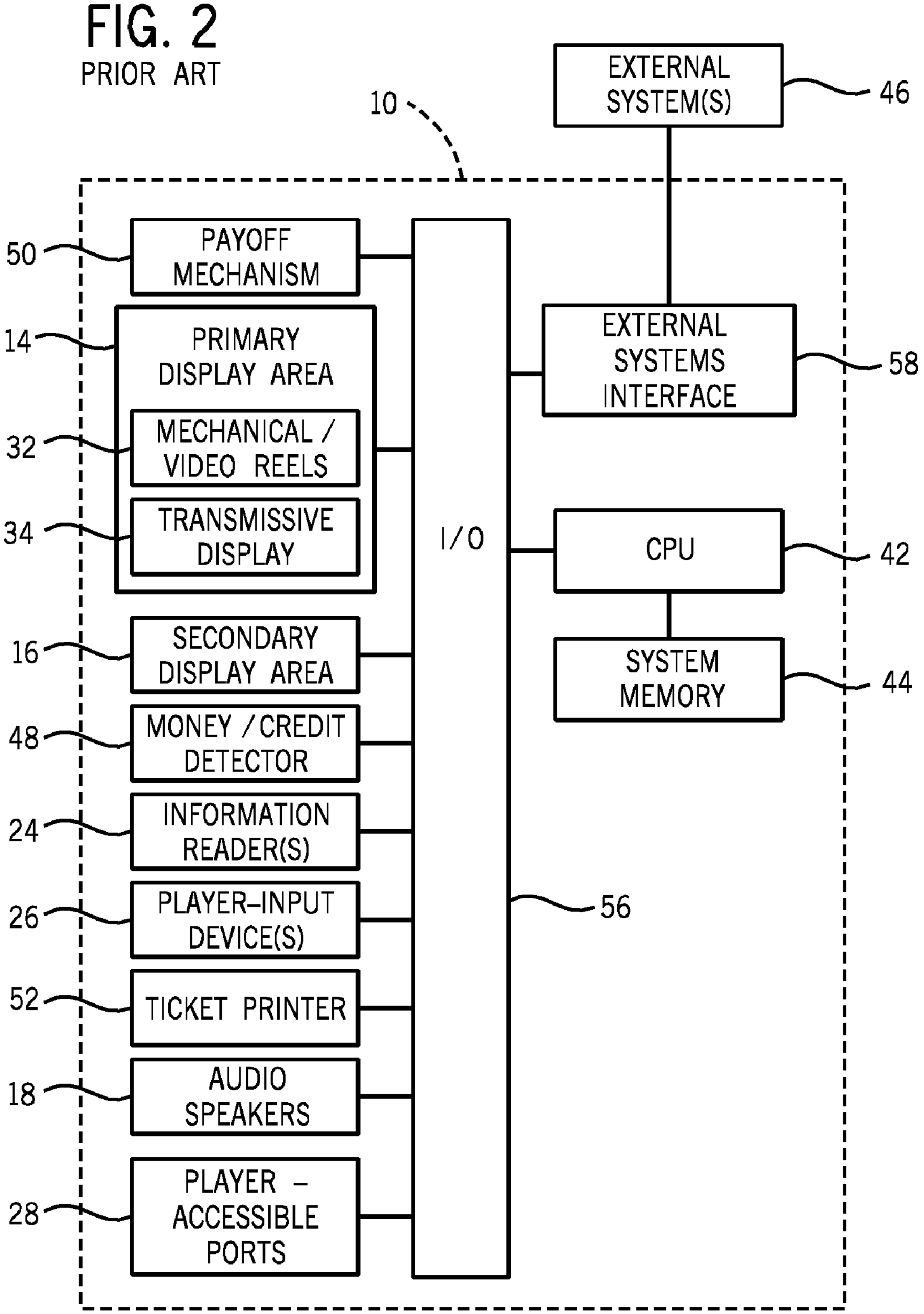
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game (s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
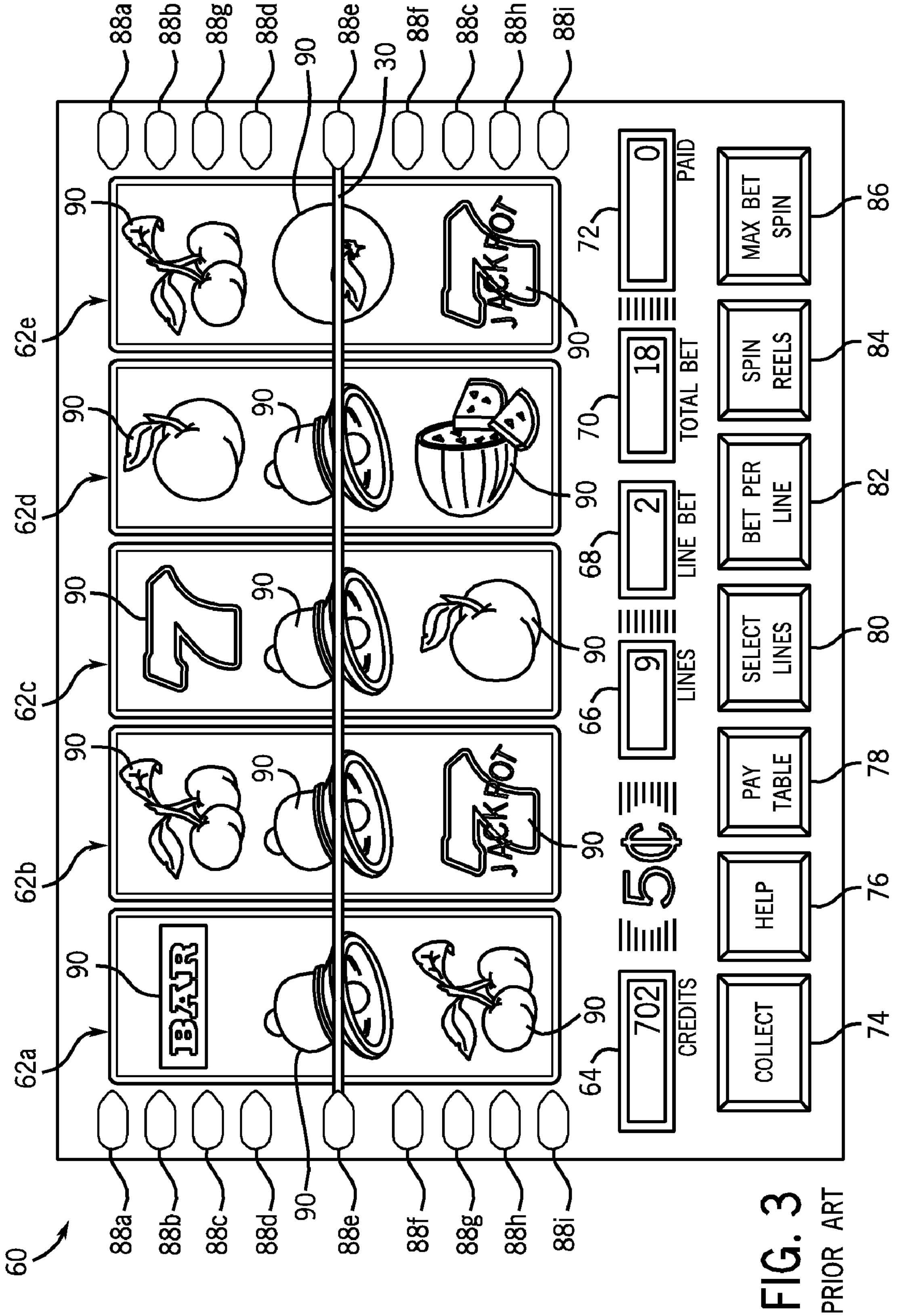
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e;* and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
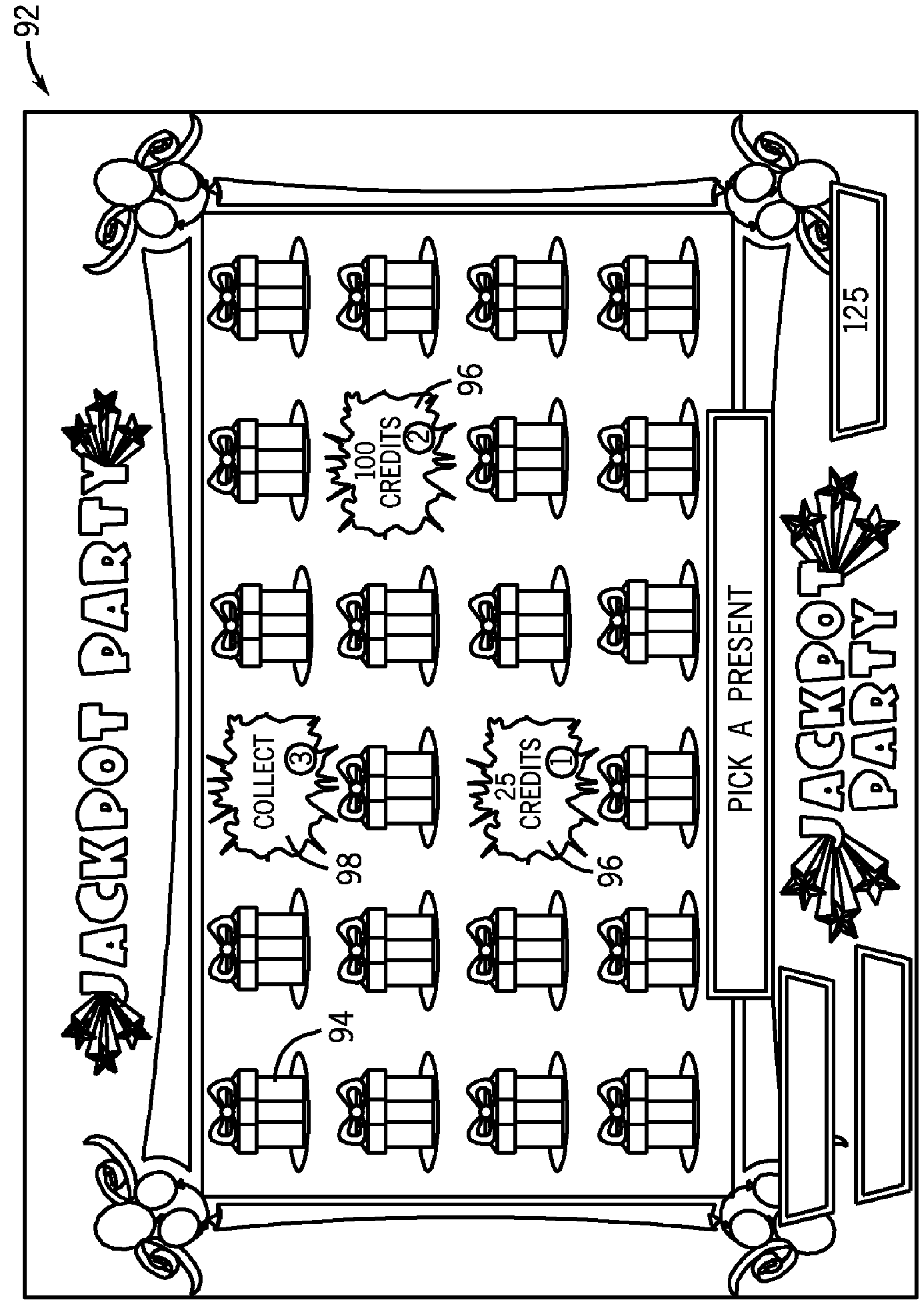
FIG. 4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
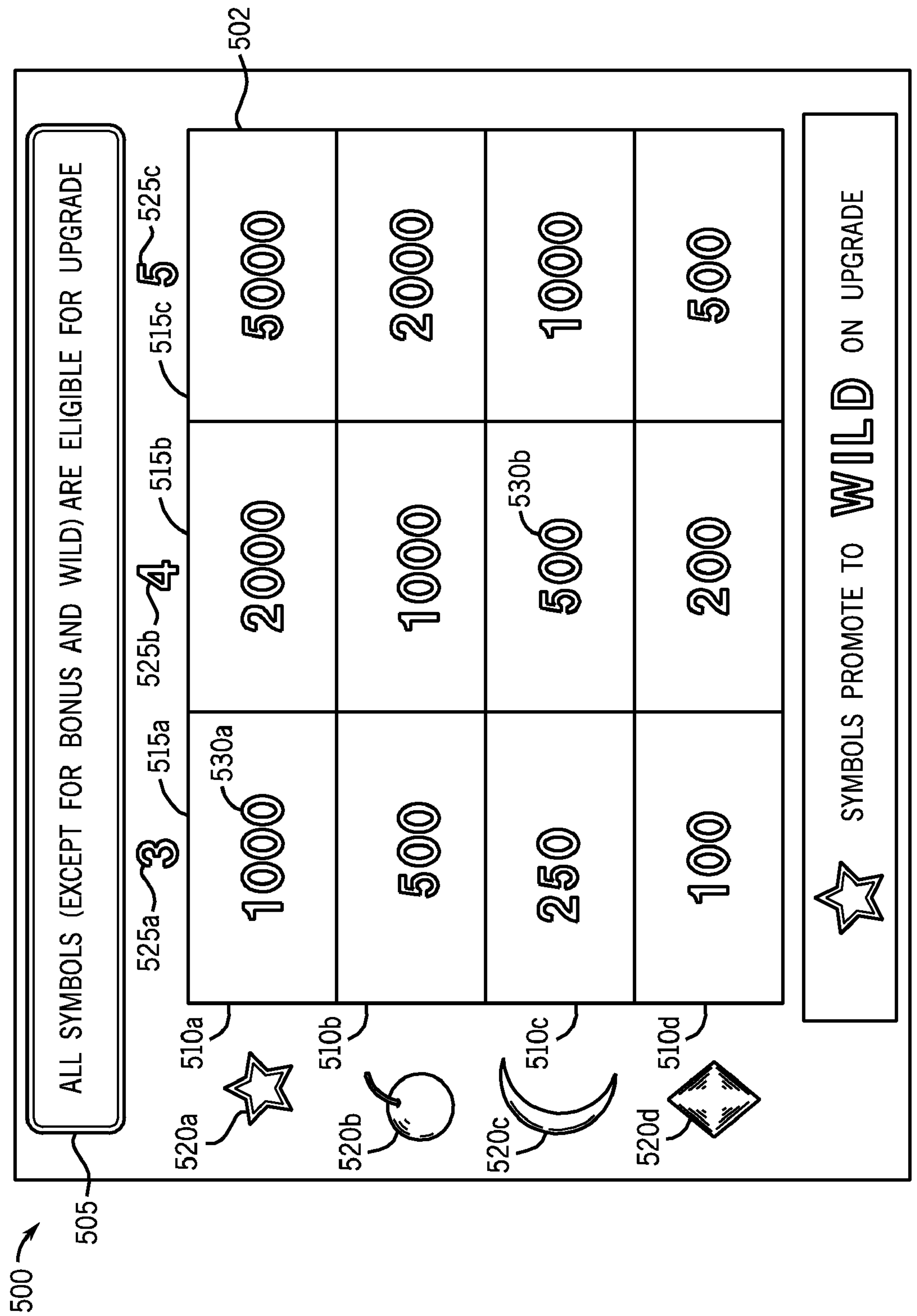
FIG. 5 is an image of a pay table that may displayed in conjunction with a wagering game, according to an embodiment of the present invention.

Referring now to FIG. 5, a pay table 500 is shown that may be referenced in conjunction with a gaming system or method using symbol promotion features. In an embodiment, the pay table 500 informs a player of an award size associated with a particular outcome of a game. The pay table 500 may be displayed on a secondary display or on a portion of a primary display, or any other display accessible to a player. In some embodiments, the pay table 500 is comprised of an information field 505 that may display general information concerning information about game payouts and game play. In this embodiment, the information field 505 informs the player that all symbols may be upgraded or promoted except "BONUS" and "WILD" symbols.

In at least some embodiments, the pay table 500 is further comprised of a matrix 502 which displays the award size associated with a number of symbols aligning on an activated payline. The matrix 502 is comprised of rows 510*a,b,c,d* and columns 515*a,b,c*. Each row 510*a,b,c,d* is associated with a symbol 520*a,b,c,d* which fronts, or heads, each row 510*a,b, c,d*. For example, a "Star" symbol 520*a* heads a first row 510*a*, a "Cherry" symbol 520*b* heads a second row 510*b*, a "Moon" symbol 520*c* heads a third row 510*c*, and a "Diamond" symbol 520*d* heads a fourth row 510*c*.

Each column 515*a,b,c* is headed with a number 525*a,b,c* that indicates the number of symbols 520*a,b,c,d* that must appear aligned on an activated payline for a player to receive an award. For example a first column 515*a* of the pay table matrix 502 comprises payouts associated with three ('3') 525*a* symbols 520*a,b,c,d*, appearing on an activated payline. A second column 515*b* comprises payouts associated with four ('4') 525*b* symbols 520*a,b,c,d* appearing on an activated payline. A third column 525*c* comprises payouts associated with five ('5') 525*c* symbols 520*a,b,c,d* appearing on an activated payline.

In an embodiment, the intersection of the rows 510*a,b,c,d* and columns 515*a,b,c* of the pay table matrix 502 displays a payout a player may be awarded when the number 525*a,b,c* of symbols 520*a,b,c,d* appearing at the head of a column align on an activated payline. For example, if three ('3') 525*a* "Star" symbols 520*a* appear on an activated payline during game play, a player may determine the payout associated with this outcome by looking at the intersection of the row headed with the "Star" symbol 520*a* and the column headed by the number three ('3') 525*a*. This is the first column 515*a* of the first row 510*a*. The first column 515*a* of the first row 510*a* indicates that a one thousand ('1000') credit payout 530*a* is associated with three ('3') 525*a* "Stars" 520*a* aligning on an activated payline. As a further example, if four ('4') 525*b* "Moons" 520*c* appear on an activated payline during game play, a player may determine the payout associated with this outcome by looking at the intersection of the row headed with the "Moon" symbol 520*c* and the column headed by the number three ('4') 525*b*. This would be the second column 515*b* of the third row 510*c*. The second column 515*b* of the third row 510*c* indicates that a five hundred ('500') credit payout 530*b* is associated with four ('4') 525*b* "Moons" 520*c* aligning on an activated payline. In this embodiment, award amounts assume a one ('1') credit wager on an activated payline. Awards are increased linearly for each credit wagered on an activated payline. Thus, an award for a five ('5') credit wager is five ('5') times greater than an award for a one ('1') credit wager. In other embodiments awards are increased in a non-linear fashion. Thus, an award for a five ('5') credit wager may be exponentially greater than an award for a one ('1') credit wager.

In an embodiment, the symbols 520*a,b,c,d* of the pay table 500 are arranged in a hierarchical manner. The hierarchy of the symbol 520*a,b,c,d* arrangement is such that a first symbol heading a first row of the table 500, is at a next higher level than a second symbol heading a second row of the table 500, and so forth. In the embodiment depicted, the symbols of the table 500 are hierarchically arranged such that an award size associated with a number of higher level symbols aligning on an active payline is greater than an award size associated with the same number of lower level symbols aligning on an active payline. Thus, for example, the award size associated with three ('3') "Star" symbols 520*a* aligning on an active payline is greater than the award size associated with three "Cherry" symbols 520*b* aligning on an active payline. The award size associated with three ('3') "Cherry" symbols 520*b* aligning on an active payline, which is five hundred ('500') credits, is greater than the award size for three "Moon" symbols 520*c* aligning on an active payline, which is two hundred fifty ('250') credits. The "Star" symbol 520*a*, therefore, is at a next higher level than the "Cherry" symbol 520*b*. The "Cherry" symbol 520*b* is at a next higher level than the "Moon" symbol 520*c*, and so forth. In at least some embodiments, a special symbol such as a "WILD" symbol having special functionality may be considered the next higher level from the highest level symbol 520*a* in the table 500. Thus in the embodiment shown, a "WILD" symbol is considered to be the next higher level symbol from the "Star" symbol 520*a* for purposes of an upgrade function described herein. In this embodiment, the symbols 520*a,b,c,d* comprising the pay table matrix 502 comprise a first subset of symbols. Thus, not all symbols of the wagering game appear in the pay table 520. Special symbols or top award symbols, such as "WILD", "BONUS" and "JACKPOT" symbols, comprise a second subset of symbols. In the embodiment depicted there are only four payline symbols. In other embodiments there may be more than four payline symbols.

Figure 6:
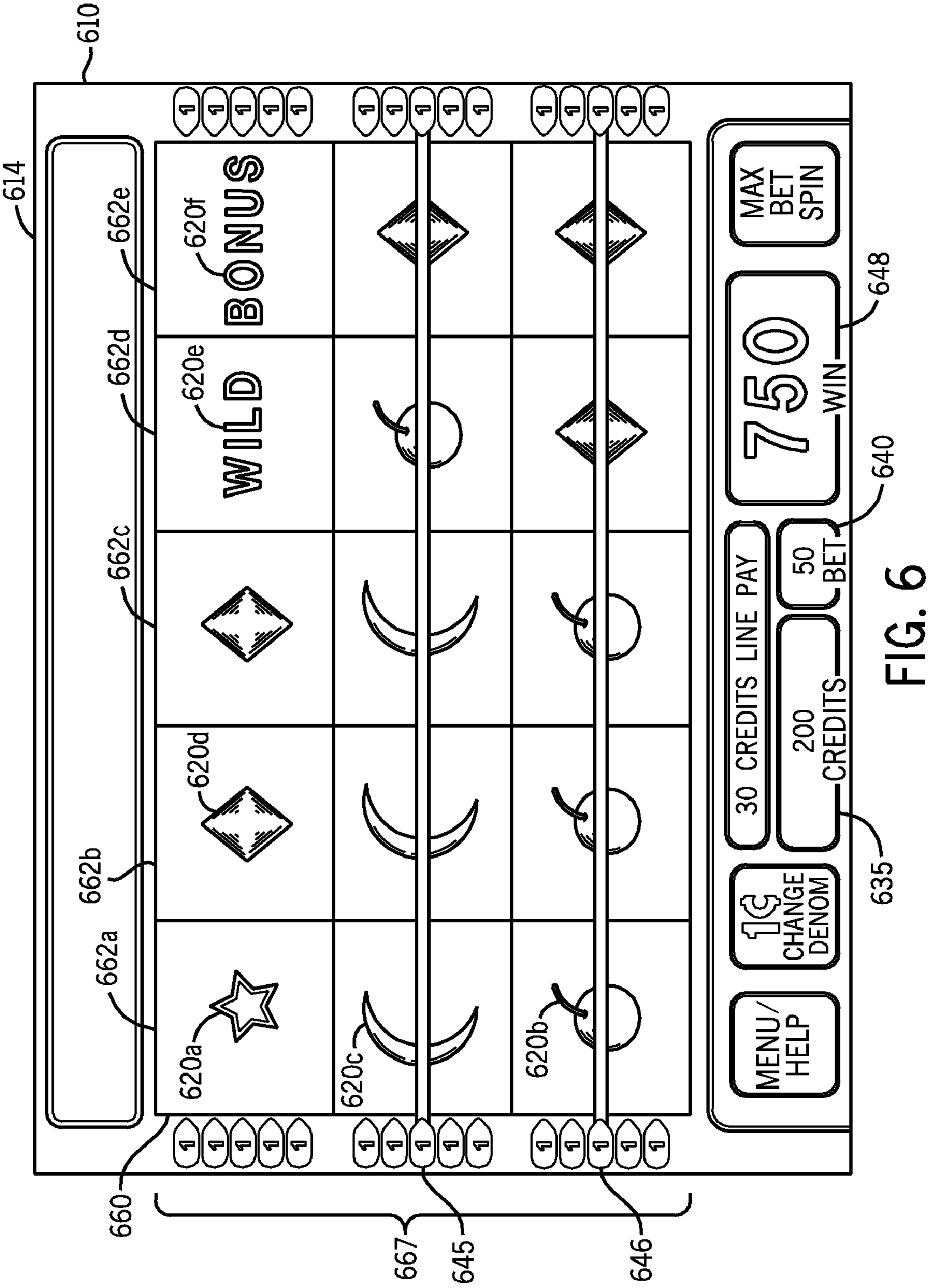
FIG. 6 is an image of a display depicting a winning outcome in a wagering game, according to an embodiment of the present invention.

Referring now to FIG. 6, a screen shot of a display 614 of a gaming device 610 of a gaming system 600 is shown. The display 614 may be any form of display such as those described with reference to the free standing and handheld devices of FIGS. 1*a* and 1*b*. The display 614 includes a display of a wagering game 660, which in this embodiment is a slot game as shown in FIG. 6. The wagering game 660 includes a plurality of symbol bearing reels 662*a,b,c,d,e* which are spun and stopped to reveal combinations of symbols 620*a,b,c,d,e,f* which are evaluated. Winning combinations of symbols 620*a,b,c,d,e,f* landing on activated paylines (those paylines for which a wager has been received), cause awards to be paid in accordance with the pay table 500 of the gaming system 600. As mentioned, payouts may vary linearly or exponentially with the number of credits waged on the winning payline. The symbols 620*a,b,c,d,e,f* on the reels 662*a,b,c,d,e* are arranged in an array or matrix 667, which in this embodiment is a 3×5 matrix 667 of symbols 620.

In an embodiment, a CREDITS meter 635 displays the number of credits a player may currently have available for game play. A BET meter 640 displays the number of credits wagered for a current game play. A WIN meter 648 displays the number of credits a player was awarded on a particular game play. In the display 614 depicted in FIG. 6, the CREDITS meter 635 displays two hundred ('200') credits available for game play. The BET meter 640 displays a fifty ('50') credit bet wagered on game play, and the WIN meter 648 displays seven hundred and fifty credits ('750') credits awarded in a game play.

In this particular game play three ('3') "Moon" symbols 620*c* are also aligned on an activated payline 645 and three ('3') "Cherry" symbols 620*b* are aligned on an activated payline 646. In an embodiment, the pay table 500 contains the award amount associated with three ('3') "Moon" symbols 620*c* aligning on an activated payline 645, and three ('3') "Cherry" symbols 620*b* aligning on an activated payline 646. The award for three ('3') "Moon" symbols 620*c* aligning on an activated payline 645 is two hundred and fifty ('250') credits. According to the pay table 500, the award for three ('3') "Cherry" symbols 620*b* aligning on an activated payline 645 is five hundred ('500') credits. Thus, the total award is seven hundred fifty ('750') credits as displayed in the WIN meter 648.

In an embodiment, the symbols 620 of the display 614 are upgraded or promoted to a next higher level upon the occurrence of a triggering event. The triggering event may be a mystery trigger event. A mystery trigger is a trigger where the player is unaware of what caused the symbol upgrade or promotion. The player simply is informed that he has been awarded a symbol upgrade or promotion. For example, mystery trigger events may include time-based triggers where a symbol promotion is awarded after a certain amount of time has elapsed. Moreover, the mystery trigger may be a randomly selected event, such that a symbol promotion is randomly awarded. In yet other embodiments, mystery triggering events may include a threshold time playing a wagering game (time on device), total wagers input meeting a predetermined amount (coin in), accumulation of a certain amount of credits, points, or assets, etc. The triggering event may also be a symbol based event. A symbol based triggering event may be a particular outcome in the wagering game 660. For example, upon the occurrence of a particular symbol in the matrix 667, the symbol upgrade event described herein may be triggered. Moreover, the event may be triggered in response to a certain arrangement of symbols, a configuration of symbols, a number of symbols collected, etc.

Figure 7:
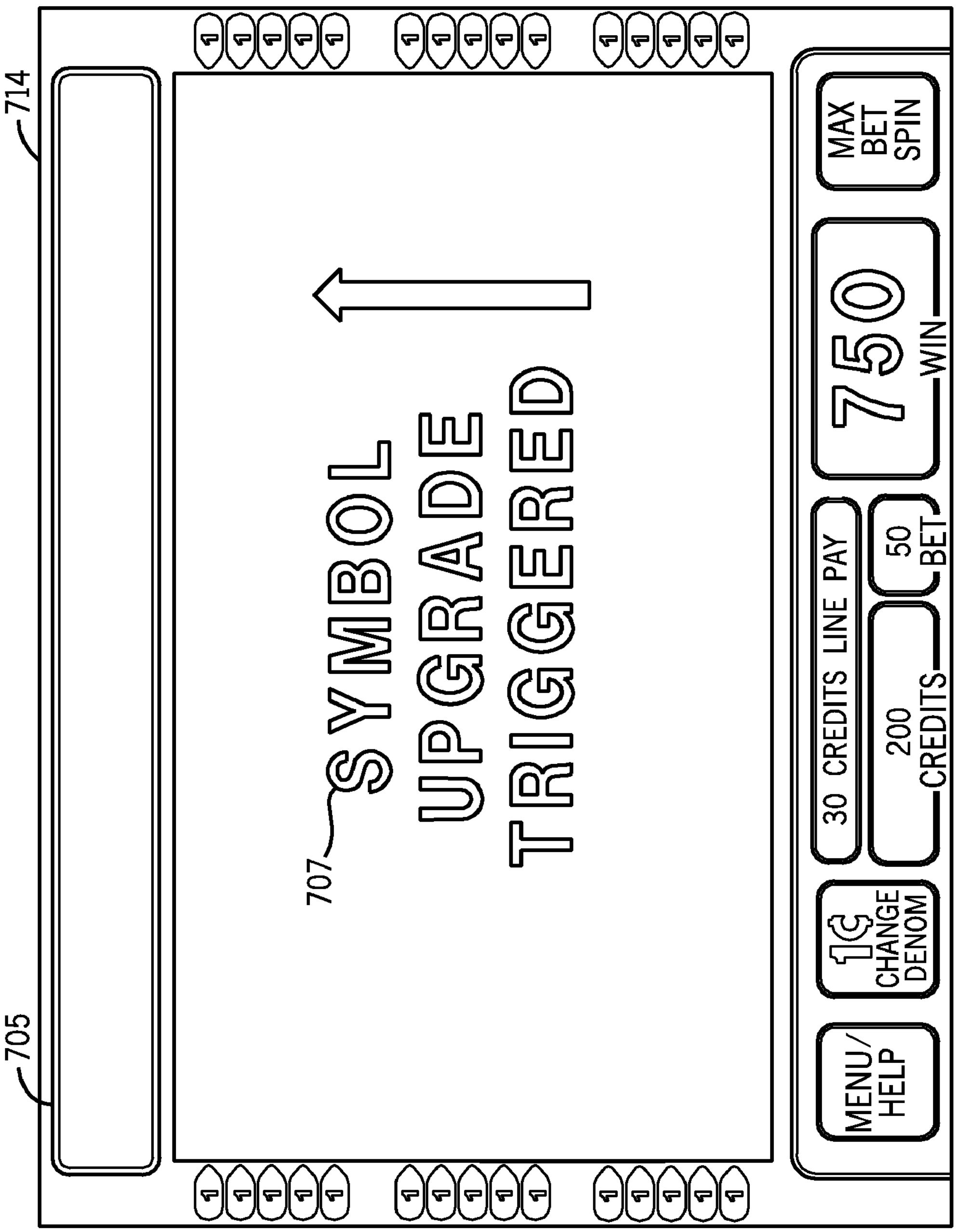
FIG. 7 is an image of a display displaying a notification of a symbol promotion, according to an embodiment of the present invention.

Turning now to FIG. 7, which depicts a display 714 upon the occurrence of a symbol promotion. The display 714 informs a player of a symbol promotion by displaying a message to the player. In the embodiment depicted, the reels of the display are covered with a message which states "SYMBOL UPGRADE TRIGGERED" 707 that further informs the player that a symbol promotion is awarded. The message 707 includes an up-arrow to graphically reinforce the concept of the upgrade.

Figure 8:
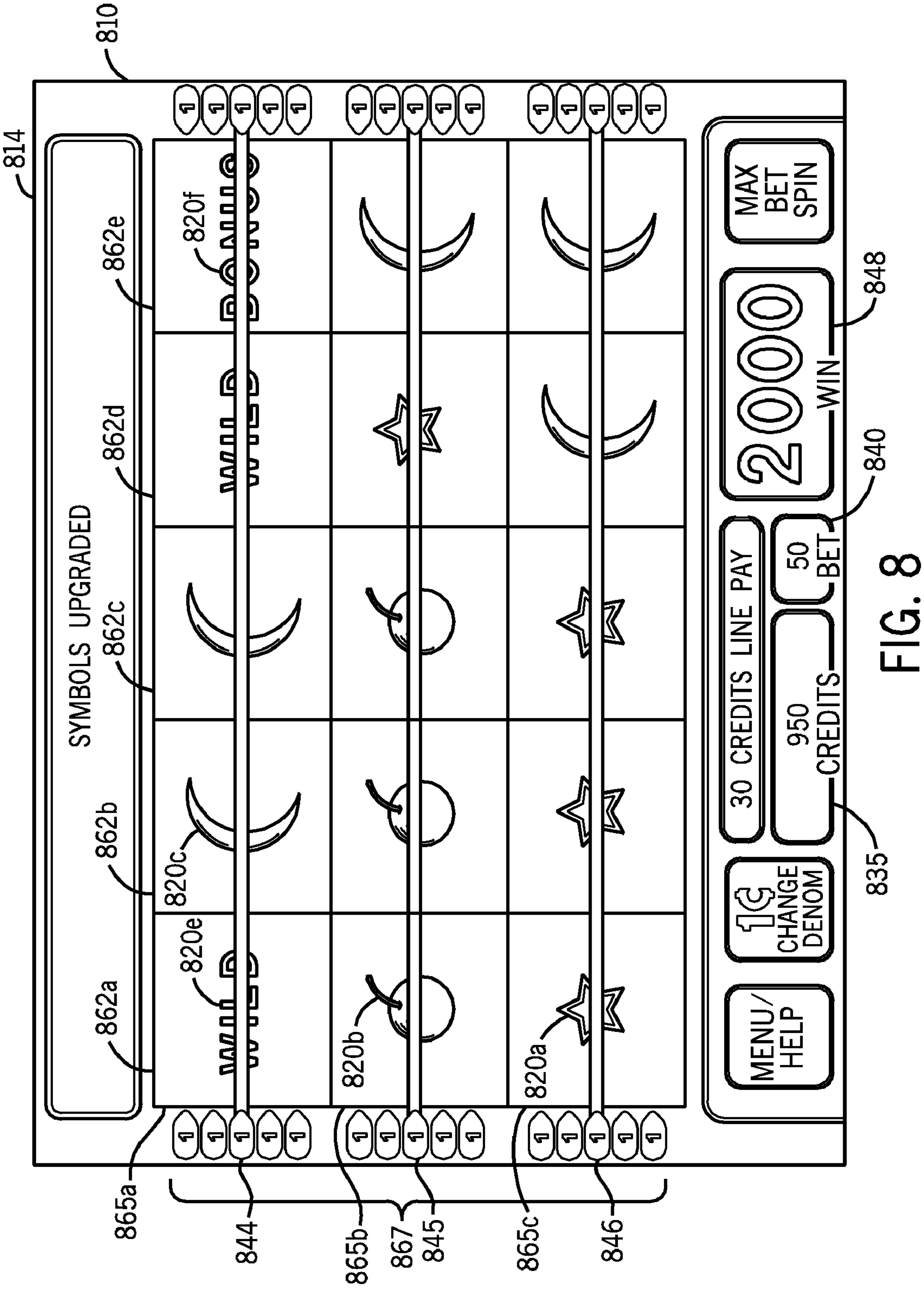
FIG. 8 is an image of a display displaying a revised outcome associated with a symbol promotion, according to an embodiment of the present invention.

Turning now to FIG. 8, a display 814 of the gaming device 810 is shown which depicts the display 614 of FIG. 6 after a symbol promotion has occurred. In some embodiments, a promotion results in each symbol comprising the matrix 867 of symbols 820*a,b,c,e,f* on the reels 862*a,b,c,d,e* being promoted to a next higher level. The promotion is done in accordance with the symbol hierarchy of the pay table 500. The result of the promotion is a revised outcome of the game 810 comprised of a revised matrix 867 of symbols 820*a,b,c,e,f* appearing on the reels 862*a,b,c,d,e*. In the embodiment depicted, the revised outcome is evaluated for winning combinations and awards awarded based upon the evaluated revised outcome. Thus, in FIG. 8, each of the symbols 820 in the matrix which appears in the pay table 500 is promoted to the next higher symbol in the symbol hierarchy.

In looking at the first row 865*a* of the matrix 867, the result of symbol promotion is that the two "Diamonds" symbols comprising the third column 862*a* and fourth column 862*b* are promoted to "Moon" symbols 820*c*. As discussed, in an embodiment of the invention a highest level symbol (in this case a Star symbol) is promoted to a "WILD" symbol. In the embodiment depicted, a "Star", which is a highest level symbol in accordance with the pay table 500, is promoted to the "WILD" symbol 820*e* as displayed in the first column 862*a* of the first row 865*a*. In some embodiments of the invention, special symbols, such as "WILD", "BONUS" and "JACKPOT" may remain unchanged. Thus, in an embodiment, top award symbols are not promoted when a symbol promotion occurs. Thus the "WILD" and "BONUS" symbols of the fourth column 862*d* and fifth column 862*e* of the first row 865*a* remain unchanged after the symbol promotion. Evaluating the first row for winning combinations in accordance with the pay table 500 results in an award of five hundred ('500') credits for the winning combination of two "Moon" symbols 820*c* and two "WILD" symbols 820*e*, which result in the five hundred ('500') credit payout associated with four ('4') "Moon" symbols 820*c* aligning on the activated payline 844.

Promoting the symbols 820 of the second row 865*b* of the display 814 results in three "Cherry" symbols 820*b* that have been promoted from "Moon" symbols, a "Star" symbol 820*a* that has been promoted from a "Cherry" symbol, and a "Moon" symbol 820*c* that has been promoted from a "Diamond" symbol. Evaluating the second row 865*b* for winning combinations in accordance with the pay table 500 results in a five hundred ('500') credit award for the winning combination of three "Cherry" symbols aligning on an activated payline 845.

The third row 865*c* of the display 814 depicts three "Star" symbols 820*a* that have been promoted from "Cherry" symbols, and two "Moon" symbols 820*c* that have been promoted from "Diamond" symbols. Evaluating the third row 865*c* for winning combinations in accordance with the pay table results in a one thousand ('1000') credit award for the combination of three "Star" symbols aligning on an activated payline 846. The two thousand ('2000') credits displayed in the WIN meter 848 reflects the sum of the five hundred ('500') credit award of row one 865*a*, the five hundred ('500') credit award of row two 865*b*, and the one thousand ('1000') credit award of row three 865*c*. The BET meter 840 depicts the fifty ('50') credit wager placed before the symbol promotion occurred. The nine hundred and fifty ('950') credits depicted in the CREDITS meter 835 reflect the sum of the original two hundred ('200') credits available for game play plus the seven hundred and fifty ('750') credit award associated with the first outcome of the wagering game.

In an alternate embodiment the pay table further comprises special symbols, such as, for example, "BONUS" and "WILD" symbols. These special symbols appear in the hierarchy of symbols with either the "BONUS" or "WILD" symbol appearing at the top of the hierarchy of symbols and the other symbol appearing in the next lower position. If, for example, the "BONUS" symbol appears at the top of the hierarchy then the "WILD" symbol appears in the next lower position and may be promoted to the "BONUS" symbol. The "BONUS" symbol, however, may not be promoted.

In a further embodiment, each symbol is promoted more than one level. For example, each symbol may be promoted two levels. Thus, the "Diamond" symbol is a lowest level symbol, the "Diamond" symbol may be promoted to a "Cherry" symbol. A "Moon" symbol may be promoted to a "Star" symbol, and so forth. The number of levels by which a symbol is promoted may be predetermined or may be randomly determined or in determined in accordance with an equation or algorithm. In still yet another embodiment, each symbol may be promoted a different number of levels. For examples, "Diamond" symbols may be promoted two levels, "Moon" symbols may not be promoted, "Cherry" symbols may be promoted one level, and so forth.

In yet another alternative embodiment, promotion of symbols associated with first outcome is associated with a symbol driven triggering event. For example, the symbol promotion feature may only be activated when three "Cherry" symbols align on an activated payline. Other winning combinations may not trigger the symbol promotion feature.

In still yet another alternative embodiment, only symbols that are part of a winning combination would visually show an upgrade. Symbols appearing on a game display that are not part of a winning combination would not be upgraded. In a further embodiment, the symbols of a winning combination may be downgraded as well as upgraded.

In another embodiment, after a winning combination appears during game play, a player may be prompted to determine if the player wants to try to upgrade the symbols comprising the winning combination. If the player tries to upgrade the symbols, the symbols may be upgraded, downgraded or remain unchanged. In a further embodiment the hierarchy of symbols is independent of the award associated with each symbol comprising the pay table. Thus, a higher paying symbol may be promoted to a lower paying symbol.

The systems and methods described herein offer a number of benefits and advantages over traditional gaming systems. By randomly offering a symbol upgrade as described herein, a player is likely to spend more time on the gaming system in anticipation of receiving a greater award through a symbol upgrade, and an exciting anticipation is created with each game play as to whether or not a player may receive a symbol upgrade. Furthermore, additional dimensions in the exciting anticipation described above may be found in variations on what symbols may or may not be upgraded and the number of levels a symbol may be upgraded.

Each of these embodiments and obvious variations thereof is contemplated as falling within the spirit and scope of the claimed invention, which is set forth in the following claims.

What is claimed is:

1. A method of conducting a wagering game on a gaming system, the method comprising:

receiving, using a wager input device operatively associated with the gaming system, a wager input to play the wagering game;

displaying, via at least one display device, a plurality of symbols arranged in an array with a plurality of rows and a plurality of columns, the displayed array of symbols being indicative of a first outcome of the wagering game;

using a processor, evaluating the first outcome for winning combinations of symbols and awarding awards associated with any such winning combinations;

using the processor, upon the occurrence of a triggering event, promoting every occurrence of at least one symbol anywhere in the array of symbols to a next higher level symbol in accordance with a pay table of the wagering game to display a revised first outcome; and using the processor, evaluating the revised first outcome for winning combinations of symbols and awarding awards associated with any such winning combinations.

2. The method of claim 1, wherein the at least one symbol is included in at least one winning combination in the first outcome.

3. The method of claim 1, wherein the at least one symbol is not included in any winning combination in the first outcome.

4. The method of claim 1, wherein the pay table is hierarchically arranged.

5. The method of claim 1, wherein the triggering event is a mystery-trigger.

6. The method of claim 1, wherein promoting every occurrence of at least one symbol in the array of symbols further comprises promoting a highest level symbol to a special symbol and promoting all non-special symbols.

7. A method of conducting a wagering game on a gaming system, the wagering game including a plurality of symbol-bearing reels, the method comprising:

using a wager input device, receiving a wager input to play the wagering game;

displaying, via at least one display device, the plurality of symbol-bearing reels spinning and stopping to reveal a plurality of symbols filling a symbol array with a plurality of rows and a plurality of columns, the symbols in the symbol array being indicative of a first outcome of the wagering game;

using a processor associated with the gaming system, evaluating the first outcome for winning combinations of symbols and awarding a first award for any winning combinations in the first outcome;

using the processor associated with the gaming system, upon the occurrence of a triggering event and if the first outcome includes at least one winning combination of symbols, promoting all of the symbols in the symbol array to a respective next higher symbol in accordance with a pay table of the wagering game to display a revised first outcome; and using the processor associated with the gaming system, evaluating the revised first outcome for winning combinations of symbols and awarding a second award for any winning combinations in the revised first outcome.

8. The method of claim 7, wherein the at least one winning combination of symbols is aligned on an activated payline.

9. The method of claim 7, wherein the triggering event is a mystery-trigger.

10. The method of claim 7, wherein the promoting all of the symbols comprises promoting two or more different types of symbols displayed in the symbol array each to a respective next higher symbol.

11. The method of claim 7, wherein the promoting all of the symbols comprises promoting all symbols displayed in the symbol array without respinning the plurality of symbol-bearing reels.

12. The method of claim 7, wherein the promoting all of the symbols comprises promoting all non-special symbols and promoting a highest level symbol to a special symbol.

13. A method of conducting a wagering game on a processor-based gaming system, the method comprising:

receiving, using a wager input device associated with the processor-based gaming system, a wager input to play the wagering game;

displaying, via at least one display device, a plurality of symbols arranged in an array with a plurality of rows and a plurality of columns, the displayed array of symbols being indicative of a first outcome of the wagering game;

awarding a first award associated with the first outcome; and upon the occurrence of a triggering event:

promoting a first type of symbol associated with the first outcome to a first higher level symbol in accordance with a pay table of the wagering game to display a revised first outcome, promoting a second type of symbol associated with the first outcome to a second higher level symbol in accordance with the pay table as part of the revised first outcome, and awarding a second award associated with the revised first outcome.

14. The method of claim 13, wherein at least one of the first and second types of symbols is included in at least one winning combination in the first outcome.

15. The method of claim 13, wherein the promoting the first and second types of symbols includes promoting all of the symbols in the displayed array of symbols.

16. The method of claim 13, wherein the pay table is hierarchically arranged.

17. The method of claim 13, wherein the triggering event is a mystery-trigger.

18. The method of claim 13, wherein the wagering game includes a plurality of symbol-bearing reels, and wherein the first and second types of symbols associated with the first outcome are promoted without spinning the plurality of symbol-bearing reels.

19. The method of claim 13, wherein the promoting the first and second types of symbols associated with the first outcome further comprises promoting a highest level symbol to a special symbol.

20. A gaming system comprising:

a wager input device for receiving a wager to play a wagering game;

at least one display; and at least one controller operative to:

cause the at least one display to display a plurality of symbols filling a symbol array with a plurality of rows and a plurality of columns, the symbols in the symbol array being indicative of a first outcome of the wagering game;

award a first award associated with the first outcome;

upon the occurrence of a triggering event and if the first outcome includes at least one winning combination of symbols, promote all of the symbols in the symbol array to a respective higher level symbol in accordance with a pay table of the wagering game to display a revised first outcome; and award a second award associated with the revised first outcome.

21. The gaming system of claim 20, wherein the at least one winning combination of symbols is aligned on an activated payline.

22. The gaming system of claim 20, wherein the triggering event is a mystery-trigger.

23. The gaming system of claim 20, wherein the promoting all of the symbols comprises promoting two or more different types of symbols displayed in the pay table.

24. The gaming system of claim 20, wherein promoting all of the symbols associated with the first outcome further comprises promoting each occurrence of a highest level non-special symbol to a special symbol.

* * * * *